United States Patent
Al-Qaq et al.

(10) Patent No.: US 8,131,224 B2
(45) Date of Patent: Mar. 6, 2012

(54) DELAY, GAIN AND PHASE ESTIMATION FOR MEASUREMENT RECEIVERS

(75) Inventors: Wael A. Al-Qaq, Oak Ridge, NC (US); Zhihang Zhang, Cary, NC (US); Nikolaus Klemmer, Cary, NC (US)

(73) Assignee: St-Ericsson SA, Plan-Le-Oates (CH)

( * ) Notice: Subject to any disclaimer, the term of this patent is extended or adjusted under 35 U.S.C. 154(b) by 247 days.

(21) Appl. No.: 12/643,529

(22) Filed: Dec. 21, 2009

(65) Prior Publication Data

US 2011/0151800 A1  Jun. 23, 2011

(51) Int. Cl.
*H04B 17/00* (2006.01)

(52) U.S. Cl. ............... 455/67.16; 455/456.1; 455/67.11; 455/67.13; 455/115.1; 455/115.2; 455/226.1; 455/226.2; 455/226.3; 375/371; 375/375; 375/376; 342/89; 342/102; 342/103; 342/127; 324/76.77; 324/312; 324/314; 324/521

(58) Field of Classification Search ............... 455/456.1, 455/456.5, 456.6, 63.1, 67.11, 67.13, 67.15, 455/67.16, 115.1–115.2, 226.1–226.3, 296, 455/574, 68–70; 375/371–376; 342/89, 342/98, 102, 103, 127; 324/76.77, 76.78, 324/76.79, 312, 314, 520, 521

See application file for complete search history.

(56) References Cited

U.S. PATENT DOCUMENTS

| | | | | |
|---|---|---|---|---|
| 5,584,065 A | * | 12/1996 | Monzello | ...................... 455/296 |
| 6,256,485 B1 | * | 7/2001 | Heard | ........................ 455/161.1 |
| 7,457,350 B2 | * | 11/2008 | Baker et al. | .................... 375/147 |
| 7,728,767 B2 | * | 6/2010 | Euler | ......................... 342/357.27 |
| 7,734,002 B2 | * | 6/2010 | Yi | .................................. 375/376 |
| 7,821,249 B2 | * | 10/2010 | Nose et al. | ................... 324/76.77 |
| 7,929,637 B2 | * | 4/2011 | Staszewski et al. | ........... 375/295 |
| 8,014,791 B2 | * | 9/2011 | Guigne et al. | ............. 455/456.1 |
| 2003/0104783 A1 | * | 6/2003 | Linder | ............................ 455/63 |
| 2004/0082300 A1 | * | 4/2004 | Scheck | .......................... 455/126 |
| 2008/0171518 A1 | | 7/2008 | Lorenzen | |

FOREIGN PATENT DOCUMENTS

WO  2003075485 A1  9/2003

OTHER PUBLICATIONS

3rd Generation Partnership Project. 3GPP TS 25.101 V8.4.0 (Sep. 2008. 3rd Generation Partnership Project; Technical Specification Group Radio Access Network; User Equipment (UE) radio transmission and reception (FDD) (Release 8). Sep. 2008. (See sections 6.1-6.5 and 6.8.4-6.8.5).

(Continued)

*Primary Examiner* — Tuan A Tran
(74) *Attorney, Agent, or Firm* — Coats & Bennett, P.L.L.C.

(57) ABSTRACT

Phase and gain of a transmit signal are measured at a transmitter by determining a first time delay having a first resolution at a measurement receiver between a reference signal from which the transmit signal is generated and a measured signal derived from the transmit signal by comparing amplitudes of the reference signal and the measured signal. A second time delay having a second resolution finer than the first resolution is determined at the measurement receiver between the reference signal and the measured signal based on the first time delay. The reference signal and the measured signal are time aligned at the measurement receiver based on the second time delay and the phase and gain of the transmit signal are estimated after the reference signal and the measured signal are time aligned.

32 Claims, 12 Drawing Sheets

OTHER PUBLICATIONS

Tenbroek, B. et al. "Single-Chip Tri-Band WCDMA/HSDPA Transceiver without External SAW Filters and with Integrated TX Power Control." IEEE International Solid-State Circuits Conference 2008, Session 10, pp. 202-207.

Tenbroek, B. et al. "Single-Chip Tri-Band WCDMA/HSDPA Transceiver without External SAW Filters and with Integrated TX Power Control." Discussion Slides, IEEE International Solid-State Circuits Conference 2008.

Volder, J. E. "The CORDIC Trigonometric Computing Technique." IEEE Transactions on Electronic Computers, vol. EC-8, Issue 3, Sep. 1959.

Persson, J. et al. "Transmitter Phase Shift Determination and Compensation." Co-pending U.S. Appl. No. 12/471,568, filed May 26, 2009.

* cited by examiner

DELAY, GAIN AND PHASE ESTIMATION FOR MEASUREMENT RECEIVERS

TECHNICAL FIELD

The present invention generally relates to measuring delay, gain and phase of a transmitter, and more particularly relates to estimating signal time delay of a transmitter and measuring transmit phase and gain at the transmitter output based on the estimated time delay.

BACKGROUND

A measurement receiver is typically added to a transmitter for providing a measurement of the transmit signal power back to the transmitter which in turn uses the signal power measurement for transmit gain adjustments. Conventional measurement receivers rely mostly on the RMS (root-mean-square) power estimation principle. Using the RMS methodology, the transmitted RF signal is fed back to the measurement receiver via a coupler. The coupled transmit signal is then gain controlled by an automatic gain controller, demodulated, filtered, and converted by an ADC (analog-to-digital converter) to a digital waveform for RMS power estimation. The transmitter adjusts the transmit forward gain settings in response to the RMS power estimate to ensure that the transmit signal power complies with system requirements such as those mandated by 3GPP ($3^{rd}$ Generation Partnership Project), LTE (Long Term Evolution) or other standards or requirements. The measurement receiver also measures the phase shift introduced by the transmitter when the power amplifier changes gain states, e.g. from minimum to maximum gain. The transmitter uses the phase measurement to implement appropriate phase compensation.

Gain and phase estimates can be obtained by comparing the magnitude and phase of a copy of the transmitted signal relative to the magnitude and phase of a reference signal. The theoretical limit for gain estimation is one sample. In practice however, gain and phase estimation time depends on the amount of distortion in the transmitter power amplifier, noise in the transmitter and measurement receiver, and the time alignment achieved between the reference signal and the copied transmit signal. Reliable gain and phase estimates must be obtained in time periods much shorter than those needed to obtain reliable RMS power estimates.

RMS power estimation typically requires a long observation time, in many cases more than the duration of one time slot depending on the standard, modulation type, channel bandwidth, and configuration. For example, up to 450 μs may be needed to estimate the transmit power to within acceptable accuracy levels (e.g. 0.1 dB of error) for a single resource block of a QPSK (Quadrature Phase Shift Keying) LTE signal for PUCCH (Physical Uplink Control Channel) or PUSCH (Physical Uplink Shared Channel). On the other hand, transmit power estimation may take up to 10 ms for a single resource block of a QAM (Quadrature Amplitude Modulation) LTE signal. The estimation times in both cases are prohibitively long for the same accuracy and may extend well beyond the slot duration for LTE and WCDMA (Wideband CDMA). Transmit power control is normally conducted on a per-slot basis. As such, an accurate estimate of the transmit power is needed over a small fraction of the slot duration. Furthermore, shorter measurement times provide supply power savings in the transmitter platform.

In the case of WCDMA, a typical timing requirement for obtaining a meaningful power measurement is about 25 us from the beginning of a WCDMA slot boundary. This strict timing requirement places a burdensome constraint on using RMS power measurement techniques. Another draw back of conventional RMS power estimation techniques is that a phase measurement is not produced.

Gain and phase estimation on the other hand require adjusting the delay between the reference signal and the copied transmit signal on a per-slot basis to achieve the desired estimation accuracy. Delay estimation is required due to variations in process, temperature and loading effects, as well as delays that arise along the various signal paths, e.g. due to filtering, etc. Using a fixed delay value between the reference signal and copied transmit signal can significantly degrade gain and phase estimation accuracy. Due to strict timing requirements, a quick delay estimation methodology must be employed to yield the desired accuracy in the gain and phase estimates. Also, due to the presence of noise in the copy of the transmitted signal, a more efficient approach should be employed to estimate the phase accurately.

SUMMARY

A transmitter includes a measurement receiver for measuring the phase and gain of a transmit signal. A copy of the transmit signal is input to the measurement receiver as a measured signal along with a reference signal for performing delay, phase and gain estimation. The measurement receiver converts quadrature components of the reference and measured signals into respective amplitude and phase signals. The amplitudes of the reference and measured signals can be used for delay estimation using an approach that relies on a signal-to-noise ratio (SNR) metric which exhibits very pronounced sensitivities in the vicinity of the optimal delay point. Other metrics can be used as well. The delay estimation process performed by the measurement receiver time aligns the measured and reference signals to yield highly reliable gain and phase estimates. The delay estimation methodologies described herein can use a sampling rate that is much lower than the highest sampling rate of the measurement receiver. Doing so yields a much reduced power consumption and calculation time by using a hardware implementation capable of multiplexing several operations. The phase estimation process implemented by the measurement receiver uses a magnitude threshold to allow for discarding noisy phase samples that may contribute to large variations in the phase estimate.

According to an embodiment, phase and gain of the transmit signal are measured at the transmitter by determining a first time delay having a first resolution at the measurement receiver between the reference signal from which the transmit signal is generated and the measured signal derived from the transmit signal by comparing amplitudes of the reference signal and the measured signal. A second time delay having a second resolution finer than the first resolution is determined at the measurement receiver between the reference signal and the measured signal based on the first time delay. The reference signal and the measured signal are time aligned at the measurement receiver based on the second time delay and the phase and gain of the transmit signal are estimated after the reference signal and the measured signal are time aligned.

Of course, the present invention is not limited to the above features and advantages. Those skilled in the art will recognize additional features and advantages upon reading the following detailed description, and upon viewing the accompanying drawings.

DETAILED DESCRIPTION

Figure 1:
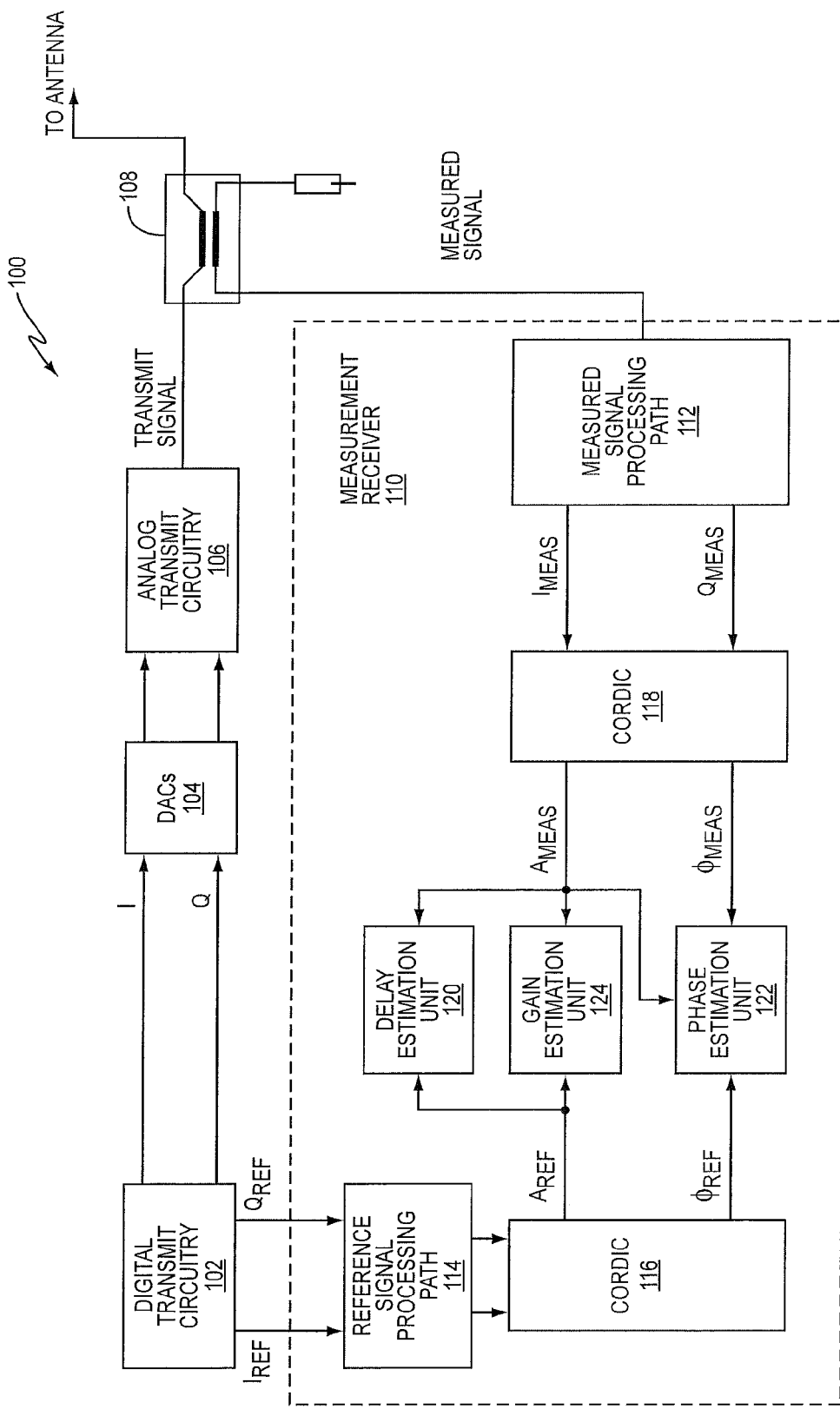
FIG. 1 illustrates a block diagram of an embodiment of a transmitter including a measurement receiver.

FIG. 1 illustrates an embodiment of a transmitter 100 including transmit circuitry and a measurement receiver 110. The transmit circuitry includes digital transmit circuitry 102 such as a waveform generator for generating a digital quadrature transmit signal (I/Q) based on a reference quadrature signal ($I_{REF}/Q_{REF}$), DACs 104 (digital-to-analog converters) for converting the digital I/Q signals to the analog domain and analog transmit circuitry 106 such as a power amplifier, automatic gain controller, etc. for generating a transmit signal based on the DAC outputs. The delay, gain and phase estimation embodiments described herein are independent of the actual transmitter implementation, i.e. the transmitter 100 may or may not include DACs and/or other particular analog signal processing circuitry. A coupler 108 is used to obtain a copy of the transmit signal, which is input to the measurement receiver 110 along with the quadrature reference signal $I_{REF}/Q_{REF}$. The measurement receiver 110 has a first signal processing path 112 for demodulating, filtering and converting the measured analog signal into respective digital quadrature components ($I_{MEAS}/Q_{MEAS}$). The measured signal processing path 112 can include circuitry such as ADCs, analog receive circuitry, etc. and can be split like the transmit path 106. The measurement receiver 110 also has a second signal processing path 114 for filtering and delaying the digital reference signal $I_{REF}/Q_{REF}$.

The measurement receiver 110 operates separately on the amplitude and phase of the reference and measured signals instead of the actual quadrature signal components to perform delay, phase and gain estimation. In one embodiment, the measurement receiver 110 includes a first CORDIC 116 (coordinate rotation digital computer) that separates the amplitude ($A_{REF}$) and phase ($\phi_{REF}$) of the digital quadrature reference signal $I_{REF}/Q_{REF}$ and a second CORDIC 118 that similarly separates the amplitude ($A_{MEAS}$) and phase ($\phi_{MEAS}$) of the digital quadrature measured signal $I_{MEAS}/Q_{MEAS}$. Other hardware and/or software may be used to extract the amplitude and phase information of the signals. By separately processing the amplitude and phase of the signals, the measurement receiver 110 generates highly reliable delay, phase and gain (and optionally distortion) estimates at much lower power levels as will be described in more detail later herein.

In one embodiment, the measurement receiver 110 includes a delay estimation unit 120 for determining a first time delay between the reference signal and the measured signal by comparing the amplitudes of the signals, the first time delay having a first resolution and being referred to herein as a coarse time delay. The reference signal is then delayed by the coarse time delay and the delay estimation unit 120 determines a second time delay between the reference signal and the measured signal based on the coarse time delay. The second time delay has a second resolution finer than the first resolution of the coarse delay, the second delay being referred to herein as a fine time delay. The measurement receiver 110 time aligns the reference signal and the measured signal based on the fine time delay. Phase and gain estimation units 122, 124 estimate the phase and gain, respectively, of the transmit signal after the reference signal and the measured signal are time aligned. Time aligning the signals in this way ensures that components within the transmitter 100 that add to the path delay as well as process or environmentally induced delay variables are accounted for when estimating the transmit signal gain and phase.

Figure 2A:
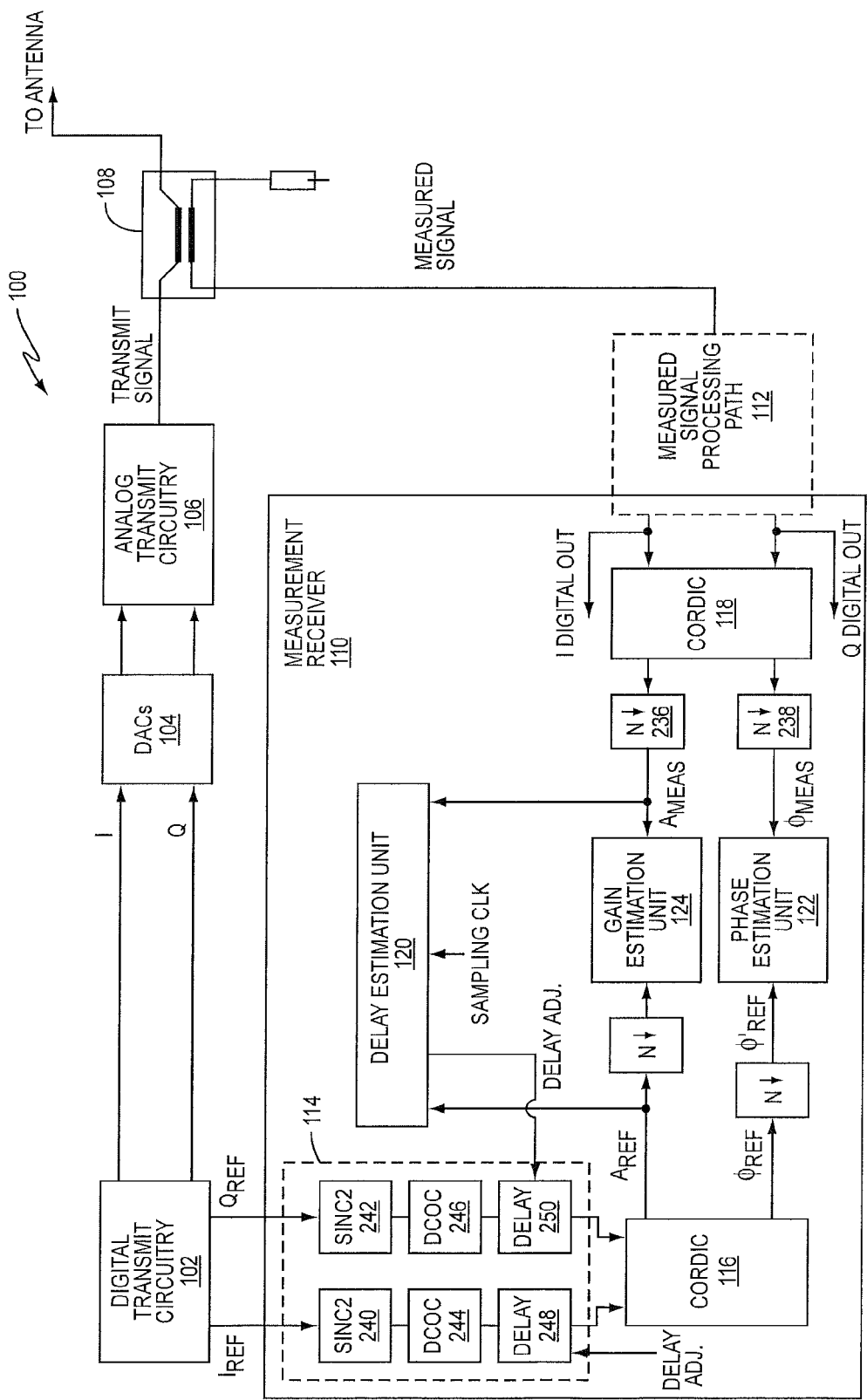
FIGS. 2A and 2B illustrate a block diagram of another embodiment of a transmitter including a digital measurement receiver.
Figure 2B:
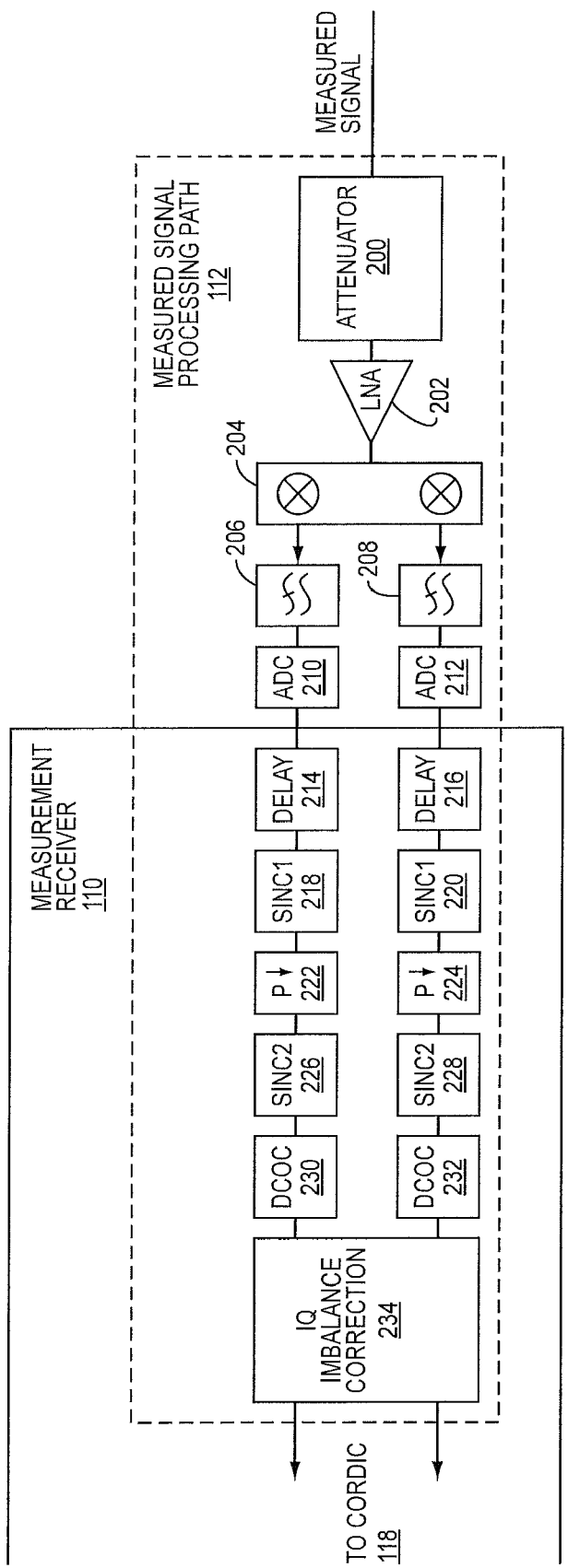

FIGS. 2A and 2B illustrate an embodiment of the transmitter 100 where the measurement receiver 110 is implemented digitally. The output of the digital waveform generator of the digital transmit circuitry 102 is input to the I/Q DACs 104 which in turn feed the analog generated signals into the analog transmit circuitry 106. In some embodiments, the analog transmit circuitry 106 includes a gain stage, an IQ modulator, a variable gain stage and a power amplifier. The analog transmit circuitry 106 can adjust the gain of the various stages included in the analog transmit circuitry 106 to meet certain transmit power requirements. The analog transmit circuitry output feeds into the coupler 108, the main output of which feeds into an antenna (not shown). A small fraction of the transmit signal is derived based on a coupling factor (e.g. −20 dB) and fed back to the measurement receiver 110 as a measured signal.

The measured signal is amplitude adjusted by an attenuator 200 and low noise amplifier 202 (LNA), IQ demodulated by a quadrature demodulator 204, filtered by complimentary low pass filters 206, 208 (LPF) and converted to the digital domain using complimentary I/Q ADCs 210, 212 running at a sampling rate above the Nyquist rate (e.g. 156 MHz) so that the measured and reference signals can be compared without any aliasing effects.

In either case, the output of the ADCs 210, 212 are delayed by respective delay blocks 214, 216, filtered by respective filters 218, 220 (SINC1), decimated by respective decimators 222, 224 by a factor of P, and filtered again by additional respective filters 226, 228 (SINC2) to provide a suitable attenuation of the ADC quantization noise and other impairments present at the ADC outputs. DC offset correction blocks 230, 232 (DCOC) correct for or estimate DC offset in the measured signal and an IQ imbalance correction unit 234 corrects IQ imbalances in the measured signal, which is then fed into the corresponding CORDIC 118 for converting the measured I/Q data stream into separate amplitude ($A_{MEAS}$) and phase ($\phi_{MEAS}$) signals. The signal processing blocks leading up to the input of the CORDIC 118 are arbitrary so long as the final inputs to the CORDIC 118 represent the measured I/Q signals, and thus should not be considered limiting in anyway.

The amplitude and phase signals $A_{MEAS}$ and $\phi_{MEAS}$ output from the CORDIC 118 are decimated by respective decimators 236, 238 by a factor N down to a lower sampling rate prior to performing the delay, gain and phase estimations. The measured signal is compared to the reference signal for extracting reliable delay, gain and phase estimates. The reference signal is preferably filtered using filters 240, 242 (SINC) identical to the filters 218, 220 used in the measured signal processing path 112. The filtered referenced signals are then passed through respective DC offset correction blocks 244, 246. Doing so ensures equal weighting is given to the reference and measured signals before the signals are compared to one another.

The reference I/Q signals are then subjected to respective delay elements 248, 250. The delay has a predetermined component set to account for the majority of the round-trip delay encountered by the transmit signal while traveling from the I/Q DAC inputs around to the output of the CORDIC 118 that processes the measured signal. The predetermined delay preferably accounts for the delay introduced by the reference and measured signal processing paths 112, 114 of the transmitter 100 as well as the group delays and latencies introduced by any analog and digital filtering. The delay estimation unit 120 of the measurement receiver 100 determines an optimal delay for adjusting the predetermined delay to better time-align the reference signal and the measured signal. The optimal delay is determined in two steps.

The delay determination unit 120 first estimates a coarse delay at a lower resolution. The coarse delay significantly reduces the number of delay steps searched over during the subsequent fine delay estimation process by which the delay estimation unit 120 determines a fine delay. The optimal delay adjustment made by the delay estimation unit 120 is based on both the coarse delay and the fine delay. The optimal delay is a reliable estimate of the delay needed to time-align the reference signal and the measured signal. Time misalignment between these two signals can significantly degrade the gain and phase estimates performed by the measurement receiver 110. This is especially true for the phase estimation process. The delay estimation unit 120 compensates for this delay to ensure highly accurate phase and gain measurements.

Figure 3:
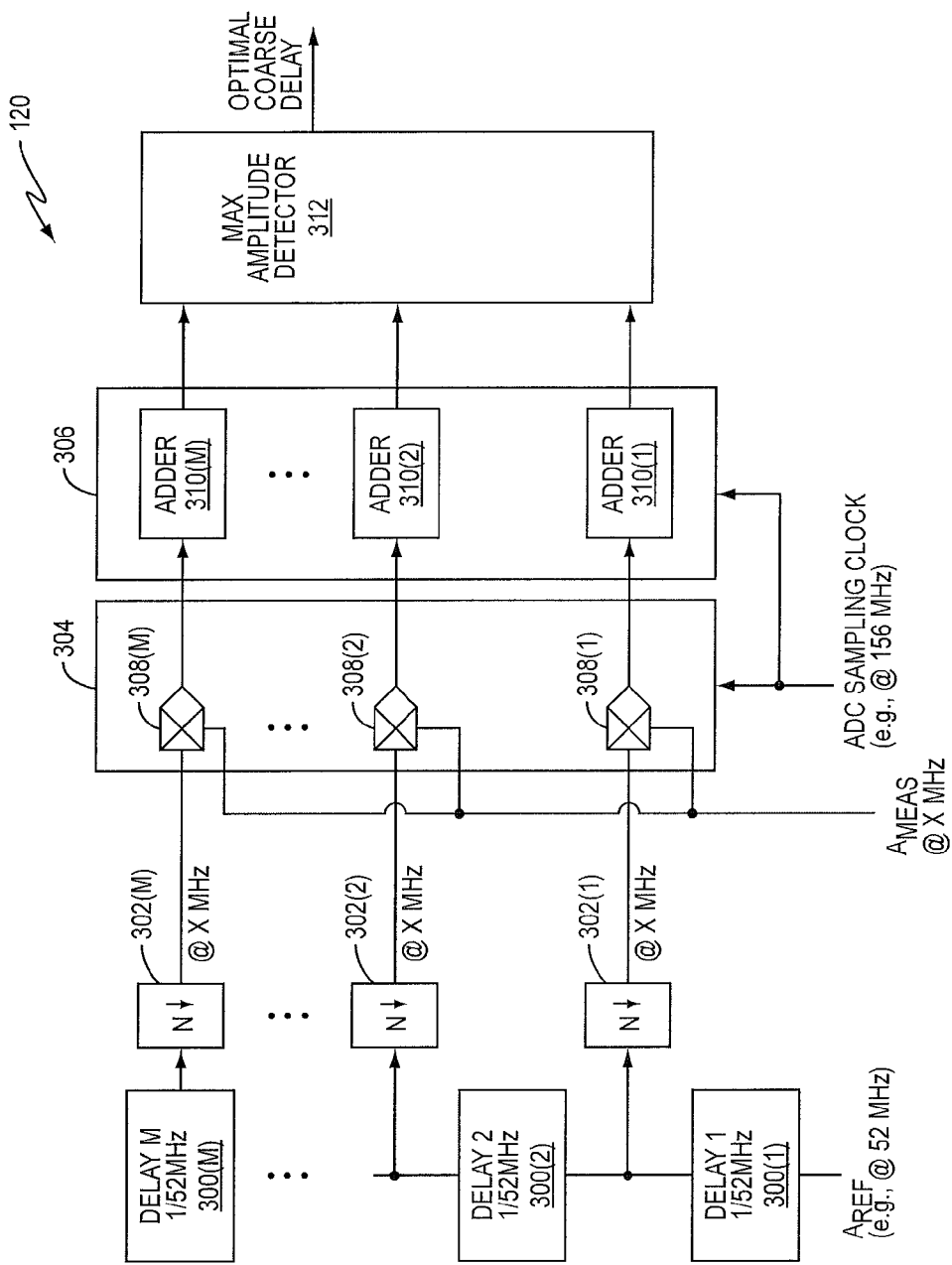
FIG. 3 illustrates a block diagram of an embodiment of a coarse delay estimation unit of a measurement receiver.

FIG. 3 illustrates an embodiment of the delay estimation unit 120. Operation of the delay estimation unit 120 is described next with reference to the measured signal $I_{MEAS}/Q_{MEAS}$ being sampled at 156 MHz and the reference signal $I_{REF}/Q_{REF}$ being sampled at 52 MHz for ease of explanation only. Those skilled in the art will readily recognize that other sampling rates are within the scope of the invention. Thus, the following description relating the delay estimation process should in no way be considered limiting with regard to the sampling rates discussed. In general, the delay estimation embodiments described next apply to any arbitrary sampling rates, communication standards, and transmitter topologies.

An optimal time alignment resolution between the reference signal and the measured signal is obtained by using fine delay steps corresponding to the sampling rate of the I/Q ADCs 210, 212 in the measured signal processing path 112 since the ADC outputs represent the highest sampling rate within the digital measurement receiver 110 (156 MHz in this non-limiting example). The fine delay is in steps of 1/156 MHz and used to delay the reference signal which is sampled at 52 MHz to within one or two steps relative to the measured signal. In other words, since the fine delay represents one-third of the 1/52 MHz delay step, the fine delay assumes one of three possible values: 0, 1, or 2. As a result of the fine delay, the maximum time alignment error between the reference and measured signals is one-half of 1/156 MHz.

The delay estimation technique begins by searching for the best (optimal) coarse time alignment between the measured and reference signals using a coarse resolution step of 1/52 MHz, which corresponds to the sampling rate of the reference signal (52 MHz in this non-limiting example). Once the optimal coarse delay is determined, the fine delay is determined at a greater resolution of 1/156 MHz, which corresponds to the sampling rate of the measured signal (156 MHz in this non-limiting example).

In more detail, the amplitude $A_{REF}$ of the reference signal is delayed by a plurality of successive delay blocks 300, yielding several instances of $A_{REF}$ at different delays. FIG. 3 shows M delay blocks 300, each block 300 delaying $A_{REF}$ (which is at 52 MHz in this non-limiting example) by a predetermined amount of time. As such, M differently delayed versions of $A_{REF}$ are provided at the reference signal sampling rate. Each successive delay block 300 represents an incremental step of 1/52 MHz in this non-limiting example. That is, the first delay block 300 corresponds to a step of 1/52 MHz and the Mth delay block 300 corresponds to a step of M/52 MHz. The delay estimation unit 120 determines the optimal number of integer steps in, $0 \leq m \leq M$ which yields the maximum magnitude correlation value. Notably, the delay estimation unit 120 applies delay 1 through delay M at a much higher sampling rate (e.g. 52 MHz in this non-limiting example) followed by a programmable decimation factor N 302 (e.g. N=6 in this non-limiting example). When N=6 in this example, each delayed version of $A_{REF}$ is at 8.67 MHz. If N=5, each delayed version of $A_{REF}$ is at 10.4 MHz, etc.

Delaying the reference signal prior to decimation ensures that the achievable time alignment error between the measured and reference signals is based on the reference signal sampling rate (52 MHz in this non-limiting example) while at the same time reducing the number of correlation operations (i.e. multiplications and accumulations) by a factor N, thus reducing power consumption while allowing the delay estimation to occur over a much shorter time period. The decimation factor N 302 can be arbitrarily high as long as the final sampling rate used for delay, gain and phase estimation is high enough to preserve the information (bandwidth) content of the measured and reference magnitude and phase signals. For example, N=6 can be used for WCDMA since an 8.67 MHz sampling rate (52 MHz/6) is high enough to preserve the information content of the amplitude and phase signals.

The delay estimation unit 120 further includes a multiplication unit 304 and an accumulation unit 306. The multiplication unit 304 includes M multipliers 308 for multiplying each delayed, decimated version of $A_{REF}$ (the amplitude of the reference signal) and $A_{MEAS}$ (the amplitude of the measured signal). $A_{MEAS}$ is at the same rate as $A_{REF}$ during multiplication (e.g. 8.67 MHz when the reference signal sampling rate is 52 MHz and N=6). The accumulation unit 306 similarly includes M adders 310 for accumulating the respective outputs of the multipliers 308. Multiplexing can be employed to carry out the multiplication and accumulation operations because the magnitude signals used for delay estimation are at a much lower sampling rate (e.g. 8.67 MHz in this non-limiting example) than the measured signal sampling rate (e.g. 156 MHz in this non-limiting example). By multiplexing, all delay paths can be processed in parallel using the much higher ADC clock rate. This enables delay estimation to occur over a very short period of time, e.g. less than 10 μs using a single multiplier/accumulator.

The delay estimation process is not compromised by lowering the sampling rate of the amplitude reference and measured signals since each delay block 300 is applied to the reference signal at the higher sampling rate prior to decimation. This holds true so long as the decimation factor N 302 is not so high that the bandwidth content of the amplitude and phase signals is compromised. For example, if the WCDMA signals are processed by the measurement receiver 110, then the I/Q signals have a typical bandwidth of 1.92 MHz and the corresponding amplitude signal has a bandwidth of roughly 4 MHz. This means for an ADC (measured signal) output sample rate of 156 MHz, the final sampling rate of the reference and measured amplitude signals $A_{REF}$ and $A_{MEAS}$ input into the delay estimation unit 120 can be as low as 8.67 MHz (e.g. 156 MHz/18) without significant aliasing. This low sampling rate ensures that the 4 MHz WCDMA amplitude signal is sampled at the least required (Nyquist) sampling rate. This ratio of 18 can be easily exploited to process multiple delay paths concurrently, assuming all multipliers 308 and adders 110 are running at the higher ADC clock rate (e.g. 156 MHz). The correlation length used by the delay estimation unit 120 can for example represent 34 WCDMA symbols which corresponds to 9 us (e.g. 78 samples based on X=8.67 MHz).

Figure 4:
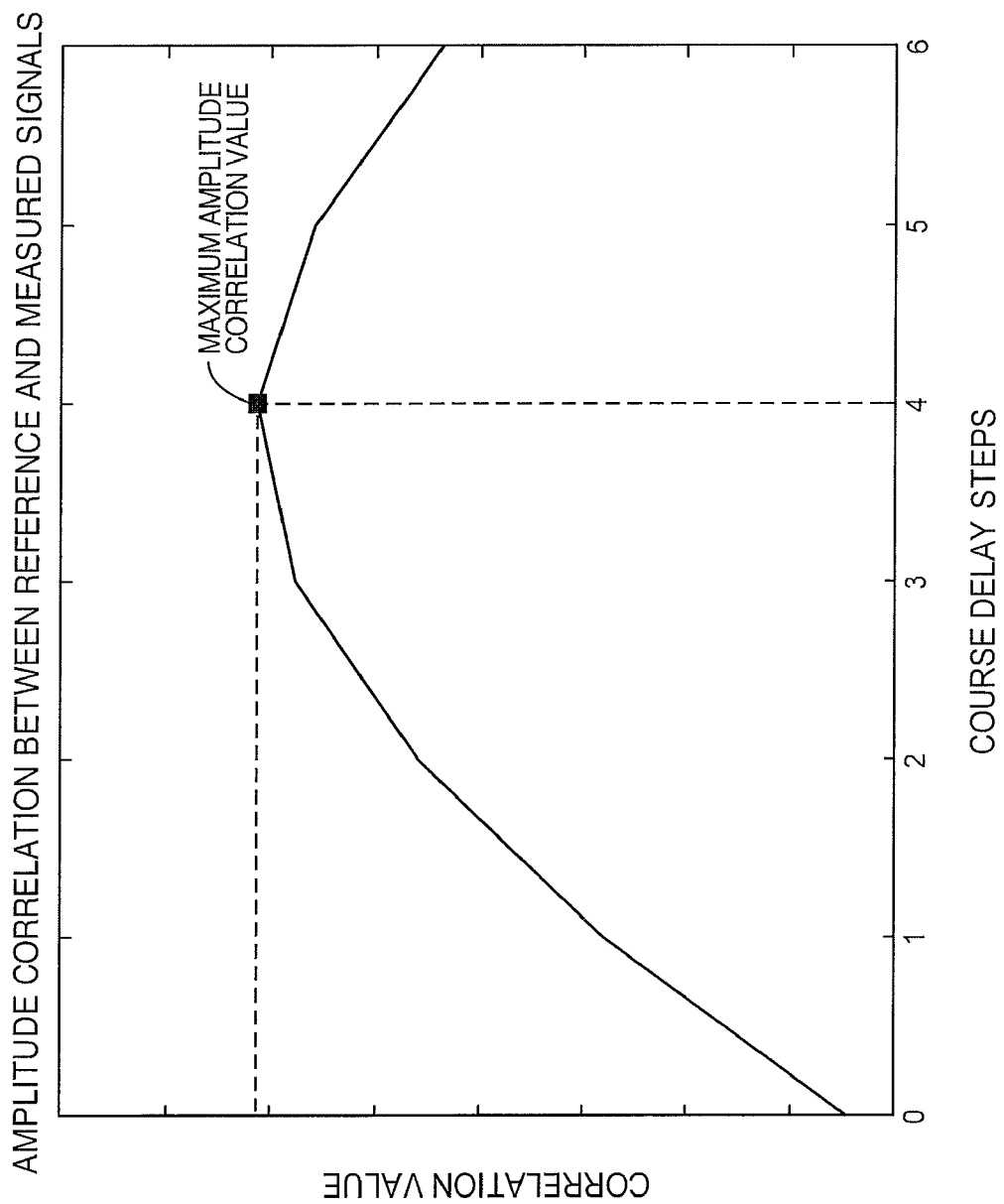
FIG. 4 illustrates a diagram showing the degree of correlation between signal amplitude and delay variation around an optimal delay point.

The delay estimation unit 120 also includes a detector 312 for identifying which one of the coarse delay values (1, 2, 3, . . . , M) corresponds to the maximum correlation value output by the accumulation unit 306. In this embodiment, the maximum correlation value is generated by correlating the amplitude of each delayed reference signal and the amplitude of the measured signal and identifying the maximum correlation value. However, the amplitude correlation values do not exhibit a large degree of sensitivity to delay variation around the optimal delay point as shown in FIG. 4. Accordingly, the coarse delay estimate can have an error of +/−1 step (e.g. of 1/52 MHz in this non-limiting example) in the presence of a noisy measured signal. This in turn has an adverse affect on the phase estimate. Instead of correlating the amplitude of the reference and measured signals to determine the optimal coarse delay, the delay estimation unit 120 can compute an SNR (signal-to-noise ratio) metric associated with each delayed reference signal and the measured signal to identify the maximum correlation value.

Figure 5:
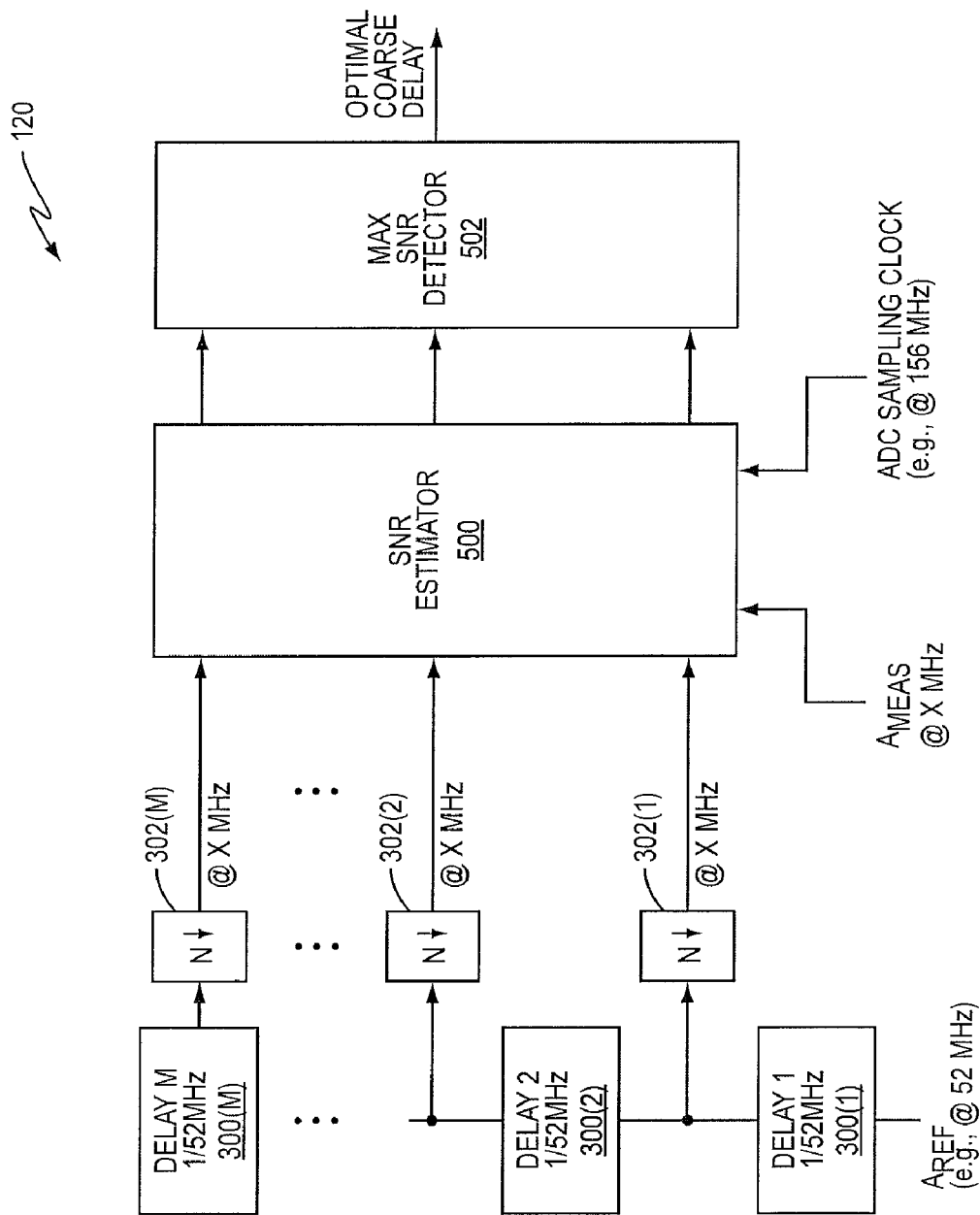
FIG. 5 illustrates a block diagram of another embodiment of a coarse delay estimation unit of a measurement receiver.

FIG. 5 illustrates an embodiment of the delay estimation unit 120 which includes an SNR estimator 500 for determining the optimal coarse delay based on SNR computations and not amplitude correlations for the reference and measured signals. The SNR estimator 500 estimates SNR metrics for the delayed reference and measured signals and correlates the SNR metric associated with each delayed reference signal and the measured signal and identifies the maximum SNR value, and thus the corresponding optimal coarse delay. The delay estimation unit 120 shown in FIG. 5 is similar to the one shown in FIG. 4, except the multiplication and accumulation units are replaced with the SNR estimator 500 for determining SNR correlation values between the reference and measured signals. A detector 502 identifies which one of the coarse delay values (1, 2, 3, . . . , M) corresponds to the maximum SNR correlation value generated by the SNR estimator 500. In this embodiment, the SNR estimator 500 computes an SNR metric associated with each delayed reference signal and the measured signal and the detector 502 identifies the maximum SNR correlation value.

Figure 6:
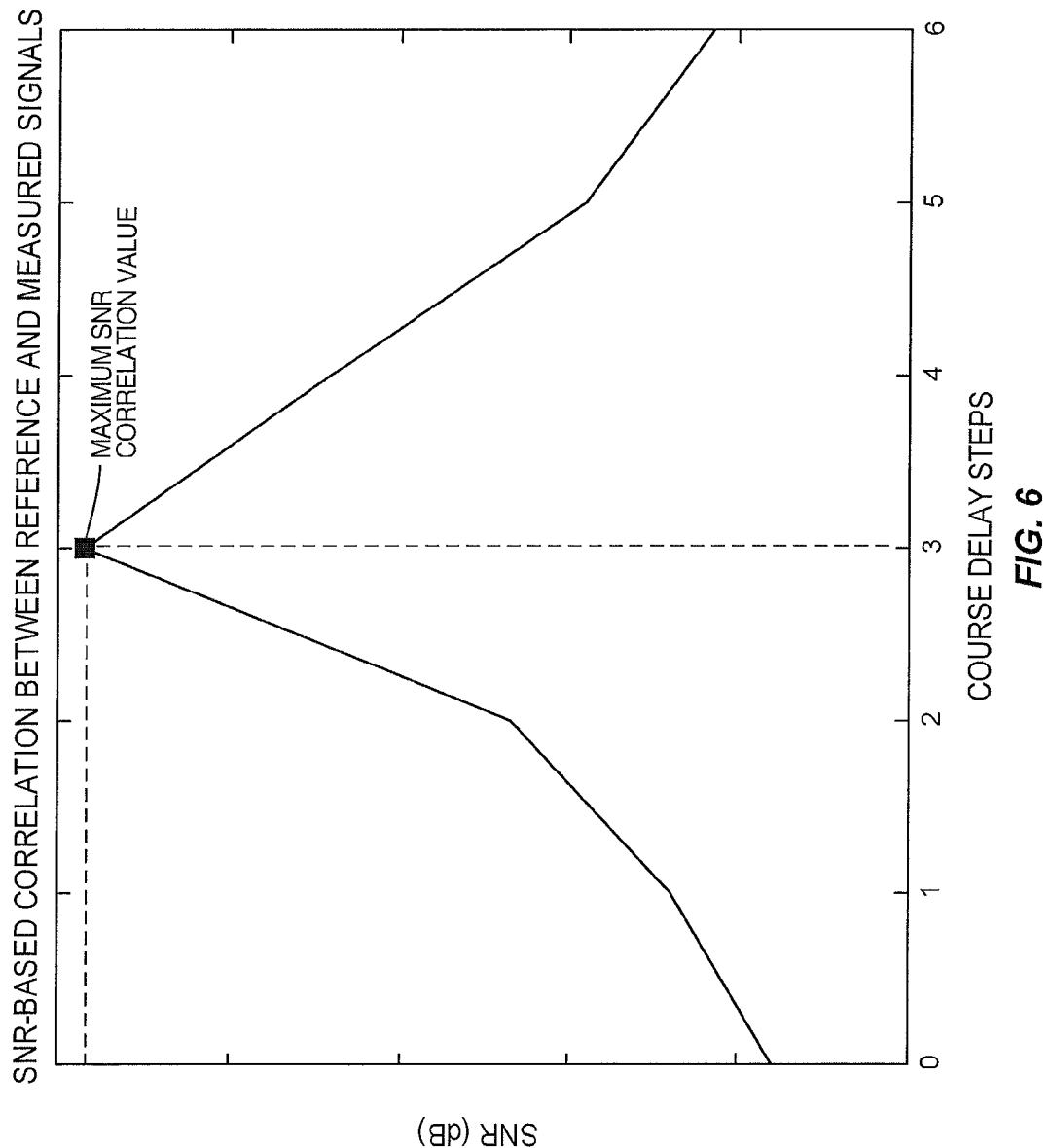
FIG. 6 illustrates a diagram showing the degree of correlation between an SNR signal metric and delay variation around an optimal delay point.

FIG. 6 is a plot showing SNR versus delay setting. The SNR metric exhibits sharper transitions versus delay as opposed to the amplitude correlation shown in FIG. 4. This is highly desired as the probability of making an error of +/−1 step (e.g. of 1/52 MHz) becomes much less likely. To quantify the SNR metric more accurately, the signal power used can be defined as the RMS (root-mean-square) power of the measured signal at the input of the delay estimation unit. Noise power is the power in the mean squared difference between the measured and reference amplitude signals as given by:

$$\text{Noise\_Power}(m, d) = \min_{G} E\{[GA_{REF}(kT_s - \tau) - A_{MEAS}(kT_s)]^2\} \quad (1)$$

where $A_{REF}$ and $A_{MEAS}$ are the amplitude (envelope) reference and measured signals respectively, $$T_s = \frac{N}{52 \text{ MHz}}, \tau = \frac{m}{52 \text{ MHz}} - \frac{d}{156 \text{ MHz}},$$

k is an integer time index (k=0, 1, . . . ∞), N=4, 5, 6, . . . , m=1, 2, . . . M and d=0, 1, 2 (as discussed earlier). The noise power is a function of the m and d integers that represent the 1/52 MHz coarse delay steps and the 1/156 MHz fine delay steps, respectively. The delay estimation unit 120 determines the optimal m and d values that provide the best achievable time alignment. Once the optimal values of m and d are obtained, the maximum time alignment error is one-half of the measured signal sampling rate (1/156 MHz in this non-limiting example).

To obtain the best linear fit that minimizes the noise power in equation (1) above, the delay estimation unit 120 computes:

$$\frac{\partial \text{Noise\_Power}(m, d)}{\partial G} = 0 \Rightarrow G_{opt}(\tau) \quad (2)$$

$$= \frac{E\{A_{ref}(kT_s - \tau) A_{meas}(kT_s)\}}{E\{A_{ref}^2(kT_s - \tau)\}}$$

where $E\{\ \}$ denotes expectation or time averaging. Substituting equation (2) into equation (1) yields:

$$\text{Noise\_Power}(m, d) = E\{A_{meas}^2(kT_s)\} - \frac{E^2\{A_{ref}(kT_s - \tau) A_{meas}(kT_s)\}}{E\{A_{ref}^2(kT_s - \tau)\}} \quad (3)$$

The RMS power of the (noise-free) measured signal is given by the RMS power of a scaled version of the reference signal, e.g. as given by:

$$\text{RMS\_Power}(m, d) = E\{G_{opt}^2(\tau) A_{ref}^2(kT_s - \tau)\} \quad (4)$$

$$= \frac{E^2\{A_{ref}(kT_s - \tau) A_{meas}(kT_s)\}}{E\{A_{ref}^2(kT_s - \tau)\}}$$

The ratio of equation (3) to equation (4) produces the following SNR expression:

$$SNR(m, d) = \frac{\text{RMS\_Power}(m, d)}{\text{Noise\_Power}(m, d)} = \quad (5)$$

$$\frac{E^2\{A_{ref}(kT_s - \tau) A_{meas}(kT_s)\}}{E\{A_{ref}^2(kT_s - \tau)\} E\{A_{meas}^2(kT_s)\} - E^2\{A_{ref}(kT_s - \tau) A_{meas}(kT_s)\}}$$

By letting:

$$Sum_1(m, d) = E\left\{A_{ref}^2\left(kT_s - \frac{m}{52 \text{ MHz}} + \frac{d}{156 \text{ MHz}}\right)\right\} \quad (6)$$

$$Sum_2(m, d) = E\{A_{meas}^2(kT_s)\}$$

$$Sum_3(m, d) = E\left\{A_{ref}\left(kT_s - \frac{m}{52 \text{ MHz}} + \frac{d}{156 \text{ MHz}}\right) A_{meas}(kT_s)\right\}$$

then:

$$SNR\_dB(m,d) = 10 \log[Sum_3^2(m,d)] - 10 \log[Sum_1(m,d)Sum_2(m,d) - Sum_3^2(m,d)] \quad (7)$$

For coarse delay estimation, it can be assumed that d=0. The value of d=0, ±1 is determined during the fine delay estimation step. In other words, the argument d can be omitted from equation (1) through equation (7), but included in equation (8) below.

Figure 7:
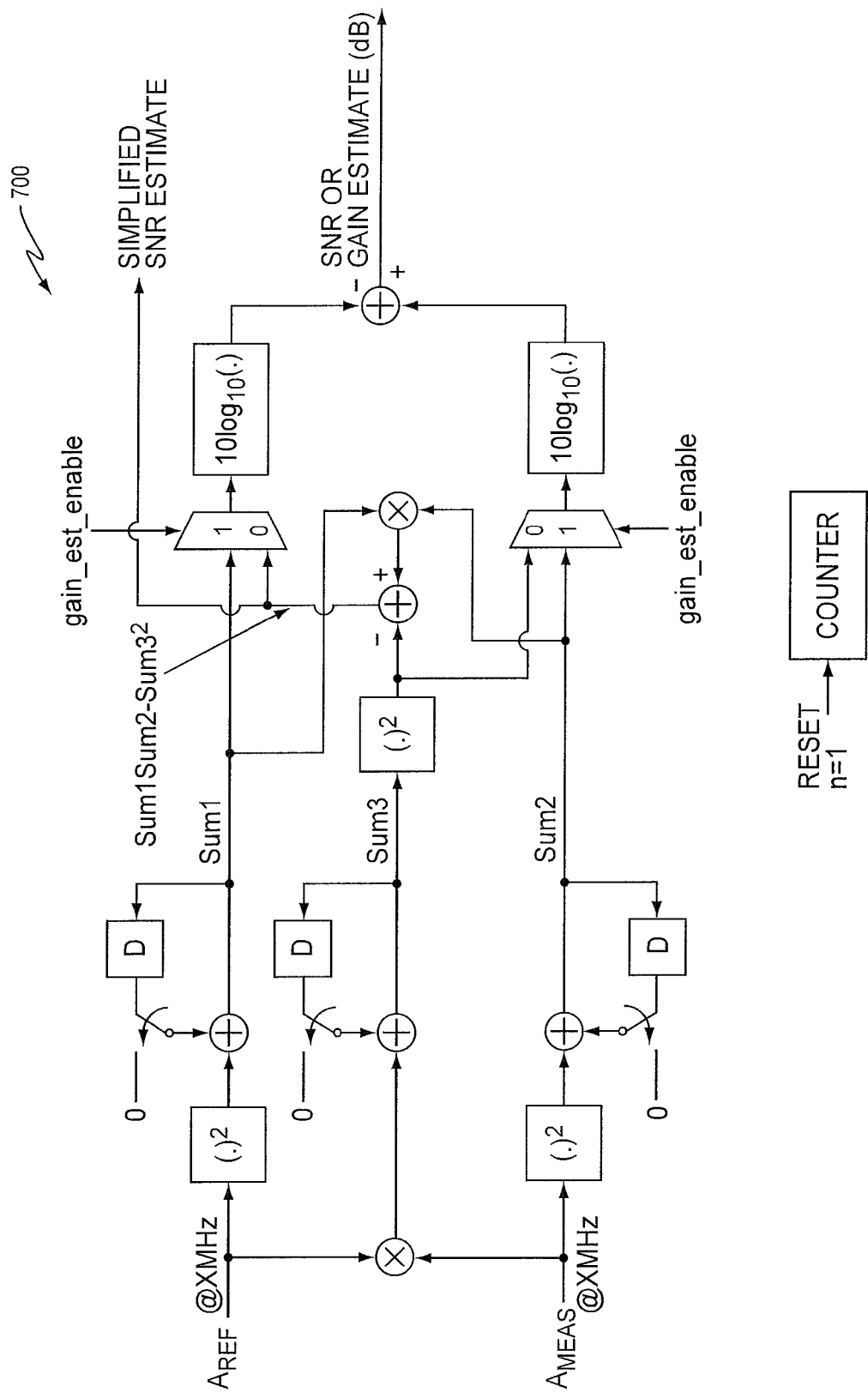
FIG. 7 illustrates a block diagram of an embodiment of a hardware-based SNR and gain estimator of a measurement receiver.
Figure 9:
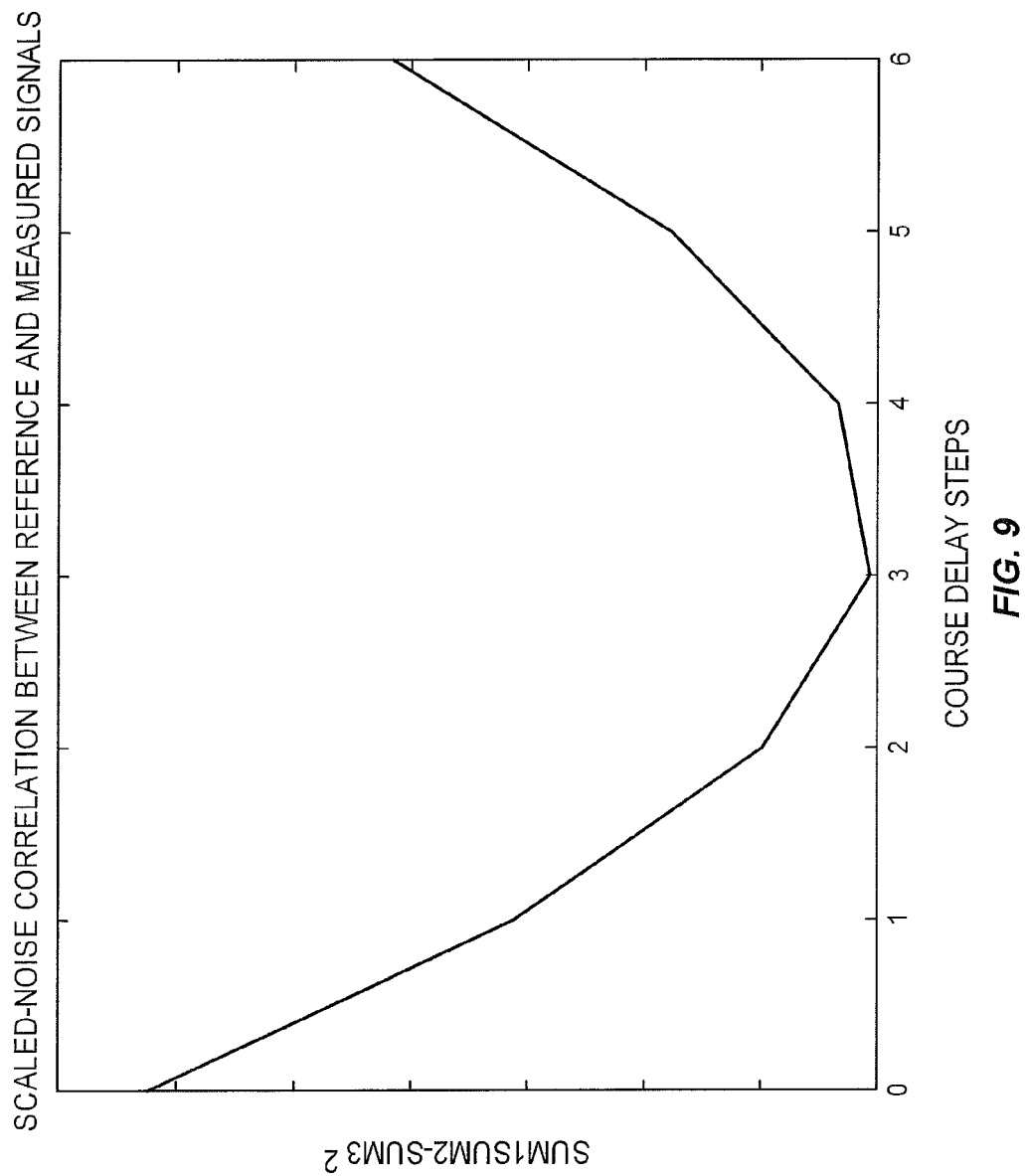
FIG. 9 illustrates a diagram of the scaled-noise correlation between a reference signal and a measured transmit signal.

FIG. 7 illustrates an embodiment of a hardware-based SNR and gain estimator 700 for implementing equation (7). The SNR and gain estimator 700 performs SNR estimation (in dB) when the signal "gain_est_enable"=0 and RMS gain estimation otherwise since an estimate of the transmit RMS gain is obtained by taking the log ratio of Sum2 to Sum1. Equation (7) involves the use of a log(.) function which poses a hardware complexity in terms of implementation and area consumption. An alternative embodiment of the SNR and gain estimator 700 approximates the SNR by implementing only the argument of the second log(.) function on the right hand side of equation (7) since this argument is the one that in effect exhibits the high sensitivity that the SNR metric possesses as shown in FIG. 9. The second log(.) argument is given by the function:

$$Y(m,d) = Sum_1(m,d)Sum_2(m,d) - Sum_3^2(m,d) \quad (8)$$

The argument of the first log(.) function effectively represents the average power in the reference signal. This average power does not exhibit much variation in the proximity of the optimal delay value. As such, the second log argument in equation (7) is the one having the high sensitivity. Thus, instead of evaluating equation (7), the optimal coarse time delay value can be determined to be the delay yielding the minimum of equation (8), i.e. the minimum of the value pointed to by the arrow labeled 'Sum1Sum2-Sum3^2' in FIG. 7.

The measurement receiver 110 then delays the reference signal by the now determined optimal coarse time delay. For example, the measurement receiver 110 can program the delay blocks 248, 250 in the reference signal processing path 114 to the optimal coarse delay. Alternatively, the measurement receiver 110 can determine the difference between the predetermined (initial) delay programmed into the reference signal processing path 114 and adjust the delay blocks 248, 250 so that they each match the optimal coarse delay. Either way, the measurement receiver 110 then determines an optimal fine time delay between the reference signal and the measured signal after the reference signal is delayed by the optimal coarse time delay.

At the beginning of the fine delay estimation process, the high precision delay step (e.g. 1/156 MHz in this non-limiting example) is set to zero (i.e. d=0) and the measurement receiver 110 searches for the m value (the lower precision delay step, e.g. 1/52 MHz in this non-limiting example) that yields the minimum scaled noise Y(m,0) in equation (8) as described above. During the lower precision delay search process, the scaled noise values Y(m, 0) are stored for m= 1, 2, ... M. The optimal d value can be determined after the optimal m integer value is determined ($m_{opt}$) by letting h be the ratio of the measured and reference signal sampling rates. In the non-limiting example described herein, $$h = \frac{156 \text{ MHz}}{52 \text{ MHz}} = 3.$$

In general, the ratio h is arbitrary and does not have to be an integer.

In an embodiment, fine delay settings $d_{opt}$ can be determined as follows. Three stored points $Y_0, Y_1, Y_2$ represent the following scaled noise values:

$$Y_{10} = Y(m_{opt}+h) = Y(m_{opt}+1,0)$$

$$Y_1 = Y(m_{opt},0)$$

$$Y_2 = Y(m_{opt}-h) = Y(m_{opt}-1,0) \quad (9)$$

From these three stored points, the delay estimation unit 120 of the measurement receiver 110 can form a second order parabolic equation around the optimal point $m_{opt}$ as given by:

$$Y(m_{opt},d) = ad^2 + bd + c, \; d \in [-h,+h] \quad (10)$$

Using the three points in equation (9) for d=-h,0,+h, the delay estimation unit 120 determines the polynomial coefficients to be:

$$a = \frac{Y_0 - 2Y_1 + Y_2}{2h^2}; \; b = \frac{Y_0 - Y_2}{2h}; \text{ and } c = Y_1$$

Thus, the optimal integer $d_{opt}$ value corresponding to the minimum (vertex) point of equation (10) is given by:

$$d_{opt} = \text{round}\left(-h\frac{Y_0 - Y_2}{2(Y_0 - 2Y_1 + Y_2)}\right) \quad (11)$$

where the function round(.) implies rounding to the closest integer in the interval (-h,+h). Equation (11) requires division which is not desirable for hardware implementations.

Figure 8:
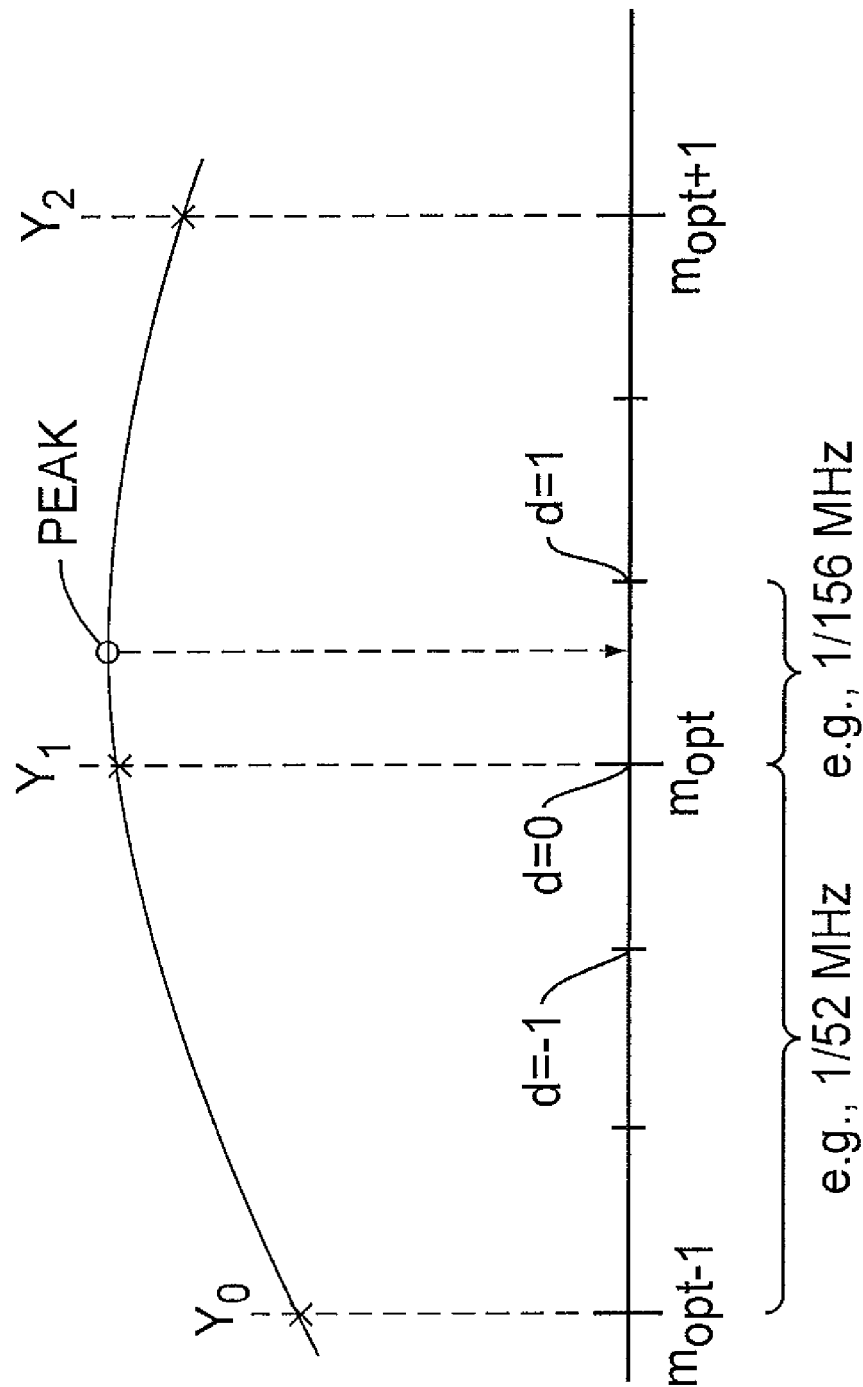
FIG. 8 illustrates an embodiment of determining an optimal fine delay by a measurement receiver.

FIG. 8 illustrates another embodiment where the delay estimation unit 120 of the measurement receiver 110 determines the optimal fine delay by setting the derivative of equation (10) with respect to d to zero as given by:

$$2(Y_0 - 2Y_1 + Y_2)d_{opt} + h(Y_0 - Y_2) = 0 \quad (12)$$

where h=3 in the example above. The optimal fine delay $d_{opt}$ is then the value that yields the minimum of equation (12) in the absolute sense. Since, by assignment, $Y_1$ minimizes Y(m, d) in the coarse sense, the search range for $d_{opt}$ is bounded in the range $d_{opt}=[-1,0,+1]$. A state machine of the delay estimation unit 120 can quickly evaluate equation (12) for d=0,±1 to determine $d_{opt}$. In general, $d_{opt}=+1$ if 2×Y2>Y0+Y1, $d_{opt}=-1$ if 2×Y0>Y1+Y2 and otherwise $d_{opt}=0$. If Y1>Y0 and Y1>Y2, $d_{opt}$ is bounded within {-h/2, h/2} or {-1.5, 1.5} for the h=3 non-limiting example. Since this is exact math, there is no need to evaluate d=+/-2, only three steps 0, +/-1. If $m_{opt}$ corresponds to one of the delay end points (i.e. 0 or M), then the next two scaled noise points above 0 (below M) are used to determine the second order coefficients and only the positive or negative integer d points are evaluated in this case.

Once $m_{opt}$ and $d_{opt}$ are determined, the lower resolution (e.g. 1/52 MHz) coarse delay $m_{opt}$ is used to set the delay in the reference signal processing path 114, e.g. by replacing or adjusting the predetermined (initial) delay blocks 248, 250 based on the optimal coarse time delay. The finer resolution (e.g. 1/156 MHz) delay $d_{opt}$ is used to set a delay in the measured signal path 112, e.g. by adjusting delay blocks 214, 216 based on the optimal fine delay $d_{opt}$. After some brief settling time, the reference signal and measured signal become time aligned and the gain estimation unit 124 of the measurement receiver 110 reliably measures the gain of the transmit signal using any conventional gain measurement technique and the phase estimation unit 122 measures the transmit signal phase.

Figure 10:
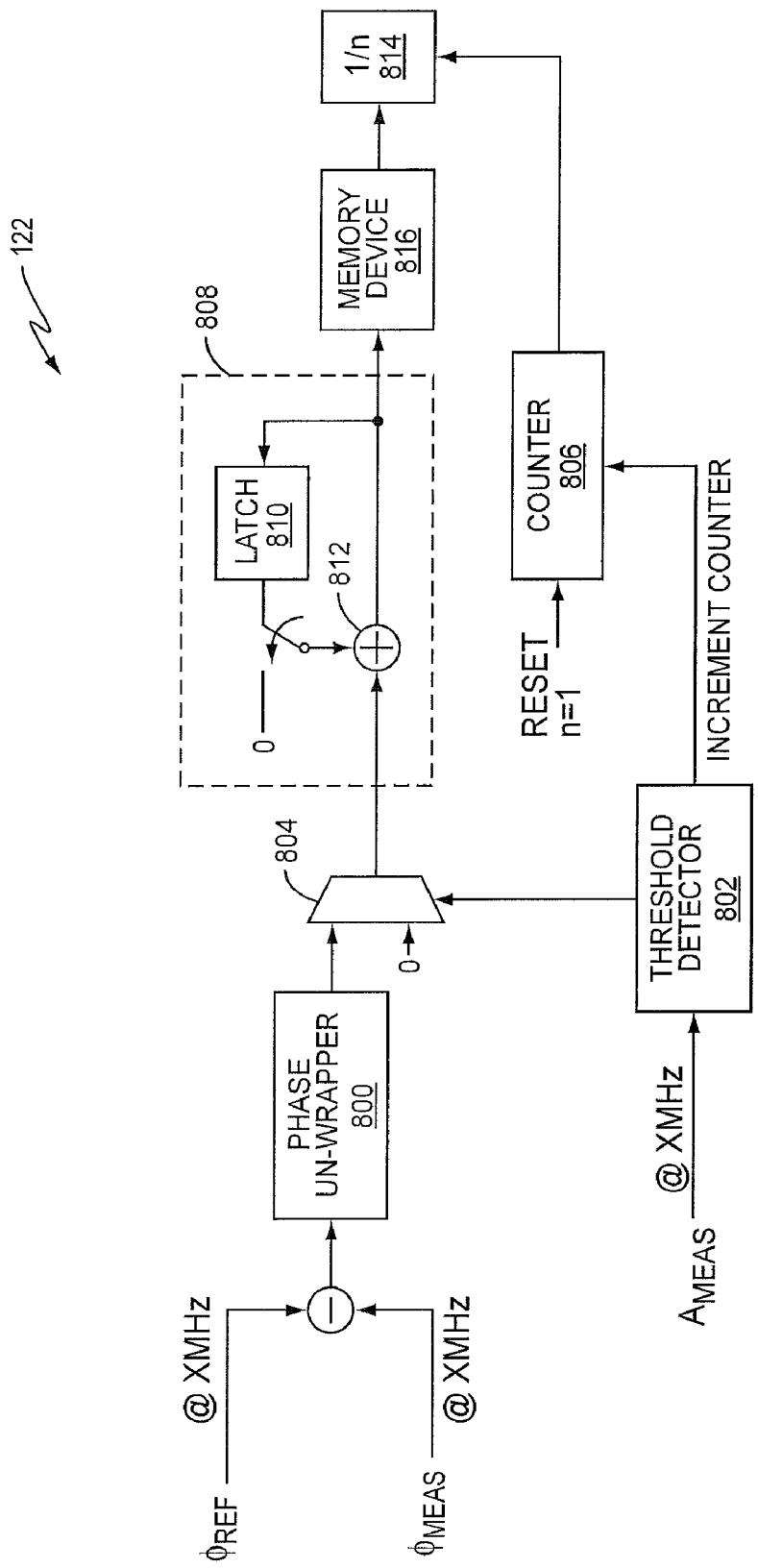
FIG. 10 illustrates a block diagram of an embodiment of a phase estimation unit of a measurement receiver.

FIG. 10 illustrates an embodiment of the phase measurement unit 122. According to this embodiment, the phase outputs of the two CORDICs 116, 118 of the measurement receiver 110 are fed into the phase estimation unit 122. The phase difference between the measured and reference phase is unwrapped using a conventional phase un-wrapper 800 to avoid abrupt transitions in the phase difference. A programmable threshold detector 802 checks the level of the measured amplitude samples $A_{MEAS}$. The threshold detector 802 causes phase samples associated with measured amplitude samples that fall below the threshold to be discarded because for these (noisy) amplitude samples, noise can cause major phase rotations in the measured signal which contributes to large variations in the phase estimate. The programmable threshold value can be set well above the expected worst case noise floor at the output of the ADCs 210, 212 in the measured signal processing path 112. For example, if the noise floor at the output of the ADCs 212, 212 is −40 dBc below the ADC full scale voltage, then the threshold value may be set to −25 dBc below full scale.

If the measured amplitude signal $A_{MEAS}$ exceeds the programmed threshold value, then the unwrapped phase difference between the reference and measurement signals is fed via multiplexer 804 into an accumulator 808 including a latch 810 and an adder 812 and a counter 806 is incremented by one. Otherwise, zero is input the accumulator 808 and the counter 806 is not incremented. The use of the threshold detector 802 causes n in FIG. 10 to be an arbitrary positive integer. To account for this, the accumulator output is saved by a memory device 816 along with 1/n for a few values of n. This allows the phase measurement unit 122 to fall back to the nearest stored phase accumulator value and the corresponding 1/n value. The value 1/n is stored instead of n to avoid division in hardware. For example, assume X=8.67 MHz for the measured and reference phase signals in FIG. 10. If the time allocated to phase estimation is 12.5 us, then the total number of samples used for phase estimation will roughly be 108 samples. In this case, a hardware-based implementation of the phase measurement unit 122 stores a few 1/n values between 0 and 108 (e.g. 1/10, 1/20, 1/30, . . . , 1/100) and the corresponding output of the accumulator 804 at these n values. In this case, if the amplitude threshold causes the counter 806 to be incremented 25 times only (e.g., n=25), then the phase measurement unit 122 uses the stored accumulated phase value at n=20 and multiplies this value by the corresponding stored value (1/20). Using a programmable amplitude threshold detector 802 significantly reduces the variance in phase estimate and helps the error in the phase estimate to converge faster toward zero.

Figure 11:
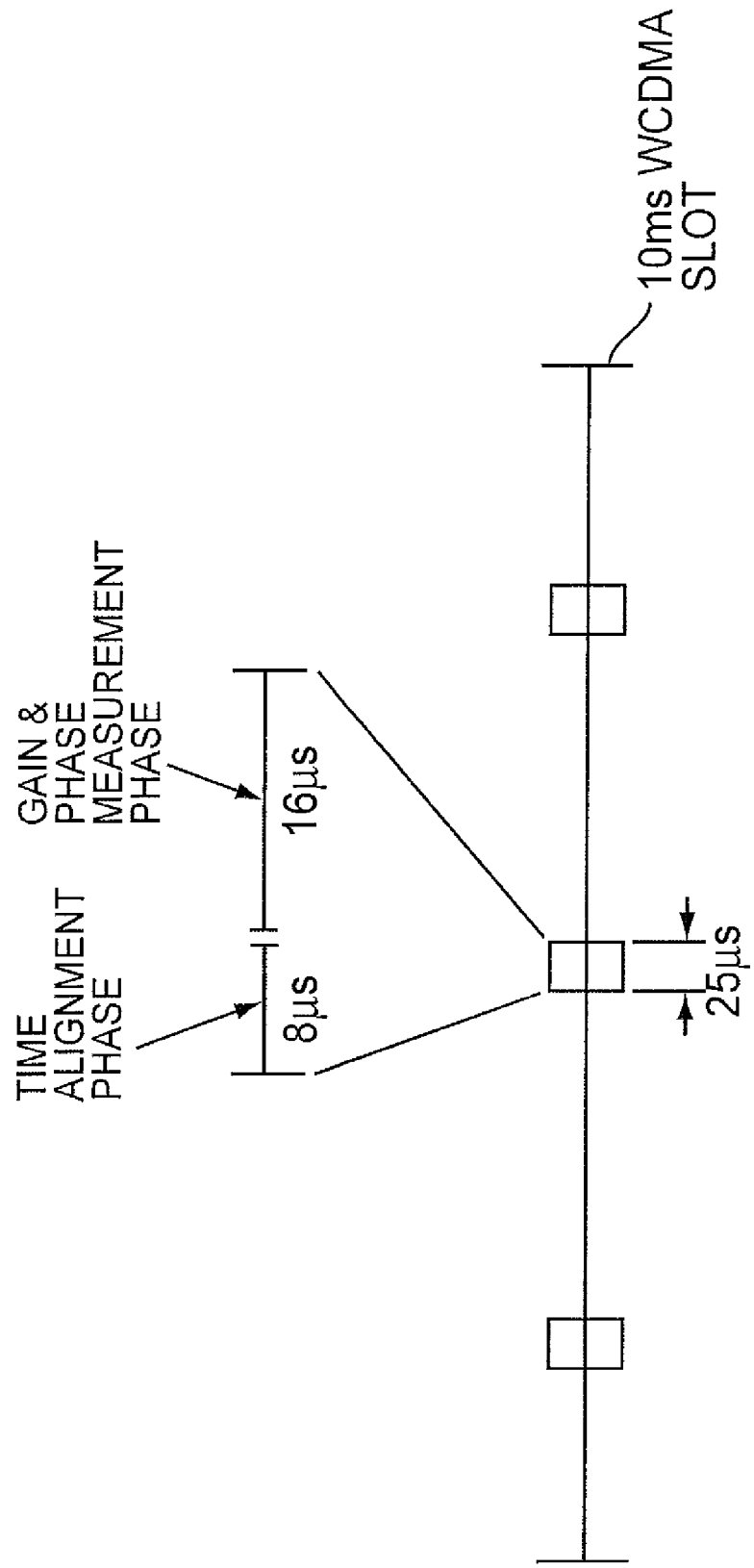
FIG. 11 illustrates a diagram of an embodiment of estimating delay, phase and gain a plurality of different times during the same time slot.

The delay, phase and gain computations described above can be performed once or more during a single WCDMA time slot to further improve the reliability of the phase and gain estimates. FIG. 11 illustrates an embodiment where the measurement receiver 110 re-computes the delay, gain and phase estimates a plurality of times during a 10 ms WCDMA time slot. Each different measurement period takes about 25 μs. During each measurement period within the time slot, the measurement receiver 110 determines the optimal and fine time delays and aligns the reference and measured signals based on the these delays as described above during approximately the first 8 μs of the measurement period. The measurement receiver 110 then measures the phase and gain of the transmit signal based on the newly aligned signals during approximately the last 16 μs of the measurement period. Repeating the delay, phase and gain measurement processes more than once during a single time slot improves the reliability of the slot-averaged phase and gain estimates, and is possible because the coarse delay estimation phase significantly reduces the range of searching performed during the subsequent fine delay estimation process. In some embodiments, this fast and robust delay estimation methodology utilizes the highly sensitive SNR metric as described above. The approach runs efficiently at relatively low sample rates while yielding a much finer time alignment needed for reliable gain and phase estimations. Some embodiments use CORDICs 116, 118 for separating out the amplitude and phase of the respective quadrature reference and measured signals, yielding readily available amplitude and phase information for gain and phase estimation. Phase estimation accuracy is substantially improved using the amplitude threshold detector 802 described above. The various embodiments described herein can be implemented in hardware, software or some combination thereof. The embodiments described herein are compatible with various transmitter topologies and communication standards including WCDMA and LTE.

With the above range of variations and applications in mind, it should be understood that the present invention is not limited by the foregoing description, nor is it limited by the accompanying drawings. Instead, the present invention is limited only by the following claims, and their legal equivalents.

What is claimed is:

1. A method of measuring phase and gain of a transmit signal at a transmitter, comprising:
    determining a first time delay having a first resolution at a measurement receiver between a reference signal from which the transmit signal is generated and a measured signal derived from the transmit signal by comparing amplitudes of the reference signal and the measured signal;
    determining a second time delay having a second resolution finer than the first resolution at the measurement receiver between the reference signal and the measured signal based on the first time delay;
    time aligning the reference signal and the measured signal at the measurement receiver based on the second time delay; and
    estimating the phase and gain of the transmit signal after the reference signal and the measured signal are time aligned.

2. The method of claim 1, comprising separating the amplitude and phase of the reference signal using a first coordinate rotation digital computer and the amplitude and phase of the measured signal using a second coordinate rotation digital computer.

3. The method of claim 1, comprising:
    determining the first time delay and the second time delay at a plurality of different times during a single time slot; and
    time aligning the reference signal and the measured signal and estimating the phase and gain of the transmit signal each time the first time delay and the second time delay are determined during the time slot.

4. The method of claim 1, comprising time aligning a plurality of amplitude samples of the reference signal and the measured signal based on the first time delay and the second time delay.

5. The method of claim 4, comprising:
    determining whether the amplitude samples of the measured signal fall below a threshold; and
    excluding each phase sample of the measured signal which corresponds to an amplitude sample that falls below the threshold from measuring the phase of the transmit signal.

6. The method of claim 1, comprising:
searching for a first optimal time alignment between the reference signal and the measured signal using a first resolution step;
coarsely aligning the reference signal and the measured signal in accordance with the first optimal time alignment;
searching for a second optimal time alignment between the coarsely aligned reference and measured signals using a second resolution step finer than the first resolution step; and
finely aligning the reference signal and the measured signal in accordance with the second optimal time alignment.

7. The method of claim 6, comprising:
inputting the measured signal to a correlator at a first rate;
delaying the reference signal to form a plurality of delayed reference signals at different delays, the reference signal being at a second rate greater that the first rate when delayed;
reducing the rate of each delayed reference signal to the first rate for input to the correlator; and
operating the correlator at a third rate greater than the first and second rates to determine the first optimal time alignment, the first optimal time alignment corresponding to the delay that yields a maximum correlation value generated by the correlator.

8. The method of claim 7, wherein the third rate is at or above the Nyquist rate.

9. The method of claim 7, comprising determining the second time delay at the third rate.

10. The method of claim 7, wherein the maximum correlation value is a maximum amplitude correlation value generated by correlating the amplitude of each delayed reference signal and the amplitude of the measured signal and identifying the maximum correlation value.

11. The method of claim 7, wherein the maximum correlation value is a maximum SNR or correlation value generated by computing an SNR metric associated with each delayed reference signal and the measured signal and identifying the maximum correlation value.

12. The method of claim 11, wherein the SNR metrics correspond to a ratio of RMS power of the measured signal to a mean squared difference between the amplitudes of the measured and reference signals.

13. The method of claim 7, comprising:
determining a scaled noise value for each of the different delays used to delay the reference signal;
identifying the minimum scaled noise value and the corresponding delay;
determining an integer (N) corresponding to the ratio of the third rate to the first rate;
selecting N−1 of the scaled noise values nearest the minimum scaled noise value; and
determining the second optimal time alignment based on the minimum scaled noise value and the N−1 selected scaled noise values.

14. The method of claim 13, comprising:
forming a parabola based on the minimum scaled noise value and the N−1 selected scaled noise values; and
identifying the parabola vertex as the second optimal time alignment.

15. The method of claim 13, comprising:
selecting the scaled noise value (Y0) associated with the next smallest delay as compared to the delay associated with the minimum scaled noise value (Y1) and the scaled noise value (Y2) associated with the next largest delay as compared to the delay associated with Y1;
selecting a point between the delay associated with Y1 and Y2 as the second time delay if 2×Y2>Y0+Y1;
selecting a point between the delay associated with Y0 and Y1 as the second time delay if 2×Y0>Y1+Y2; and
otherwise selecting the delay associated with Y1 as the second time delay.

16. The method of claim 15, wherein the spacing between the points corresponds to the second resolution step.

17. A transmitter, comprising:
transmit circuitry operable to transmit a signal generated based on a reference signal; and
a measurement receiver operable to:
determine a first time delay having a first resolution between the reference signal and a measured signal derived from the transmit signal by comparing amplitudes of the reference signal and the measured signal;
determine a second time delay having a second resolution finer than the first resolution between the reference signal and the measured signal based on the first time delay;
time align the reference signal and the measured signal based on the second time delay; and
estimate the phase and gain of the transmit signal after the reference signal and the measured signal are time aligned.

18. The transmitter of claim 17, wherein the measurement receiver includes a first coordinate rotation digital computer operable to separate the amplitude and phase of the reference signal and a second coordinate rotation digital computer operable to separate the amplitude and phase of the measured signal.

19. The transmitter of claim 17, wherein the measurement receiver is operable to determine the first time delay and the second time delay at a plurality of different times during a single time slot and time align the reference signal and the measured signal and estimate the phase and gain of the transmit signal each time the first time delay and the second time delay are determined during the time slot.

20. The transmitter of claim 17, wherein the measurement receiver is operable to time align a plurality of amplitude samples of the reference signal and the measured signal based on the first time delay and the second time delay.

21. The transmitter of claim 20, wherein the measurement receiver comprises a phase estimation unit operable to determine whether the amplitude samples of the measured signal fall below a threshold and exclude each phase sample of the measured signal which corresponds to an amplitude sample that falls below the threshold from measuring the phase of the transmit signal.

22. The transmitter of claim 17, wherein the measurement receiver is operable to search for a first optimal time alignment between the reference signal and the measured signal using a first resolution step, coarsely align the reference signal and the measured signal in accordance with the first optimal time alignment, search for a second optimal time alignment between the coarsely aligned reference and measured signals using a second resolution step finer than the first resolution step, and finely align the reference signal and the measured signal in accordance with the second optimal time alignment.

23. The transmitter of claim 22, wherein the measurement receiver comprises a correlator operable to input the measured signal at a first rate, and wherein the measurement receiver is operable to delay the reference signal to form a plurality of delayed reference signals at different delays, the reference signal being at a second rate greater that the first rate when delayed, reduce the rate of each delayed reference signal to the first rate for input to the correlator, and operate the correlator at a third rate greater than the first and second rates to determine the first optimal time alignment, the first optimal time alignment corresponding to the delay that yields a maximum correlation value generated by the correlator.

24. The transmitter of claim 23, wherein the third rate is at or above the Nyquist rate.

25. The transmitter of claim 23, wherein the measurement receiver is operable to determine the second time delay at the third rate.

26. The transmitter of claim 23, wherein the measurement receiver is operable to determine the maximum correlation value by correlating the amplitude of each delayed reference signal and the amplitude of the measured signal and identifying the maximum correlation value.

27. The transmitter of claim 23, wherein the measurement receiver is operable to determine the maximum correlation value by computing an SNR metric associated with each delayed reference signal and the measured signal and identifying the maximum correlation value.

28. The transmitter of claim 27, wherein the SNR metrics correspond to a ratio of RMS power of the measured signal to a mean squared difference between the amplitudes of the measured and reference signals.

29. The transmitter of claim 23, wherein the measurement receiver is operable to determine a scaled noise value for each of the different delays used to delay the reference signal, identify the minimum scaled noise value and the corresponding delay, determine an integer (N) corresponding to the ratio of the third rate to the first rate, select N−1 of the scaled noise values nearest the minimum scaled noise value, and determine the second optimal time alignment based on the minimum scaled noise value and the N−1 selected scaled noise values.

30. The transmitter of claim 29, wherein the measurement receiver is operable to form a parabola based on the minimum scaled noise value and the N−1 selected scaled noise values and identify the parabola vertex as the second optimal time alignment.

31. The transmitter of claim 29, wherein the measurement receiver is operable to select the scaled noise value (Y0) associated with the next smallest delay as compared to the delay associated with the minimum scaled noise value (Y1) and the scaled noise value (Y2) associated with the next largest delay as compared to the delay associated with Y1, select a point between the delay associated with Y1 and Y2 as the second time delay if $2 \times Y2 > Y0 + Y1$, select a point between the delay associated with Y0 and Y1 as the second time delay if $2 \times Y0 > Y1 + Y2$, and otherwise select the delay associated with Y1 as the second time delay.

32. The transmitter of claim 31, wherein the spacing between the points corresponds to the second resolution step.

* * * * *